United States Patent [19]
Hwang

[11] Patent Number: 5,963,270
[45] Date of Patent: Oct. 5, 1999

[54] DOUBLE WINDOW PROCESSING DEVICE FOR TELEVISION SYSTEM

[75] Inventor: Young Hwan Hwang, Taegu, Rep. of Korea

[73] Assignee: LG Electronics Inc., Seoul, Rep. of Korea

[21] Appl. No.: 08/982,321

[22] Filed: Dec. 2, 1997

[30] Foreign Application Priority Data

Dec. 5, 1996 [KR]   Rep. of Korea ..................... P96-61769

[51] Int. Cl.⁶ ......................................................... H04N 5/45
[52] U.S. Cl. ............................ 348/588; 348/565; 348/566
[58] Field of Search ..................................... 348/563, 564, 348/565, 566, 569, 584, 588, 598, 599, 663, 665; H04N 5/445, 5/45

[56] References Cited

U.S. PATENT DOCUMENTS 5,815,216   9/1998   Suh ........................................... 348/565
5,831,591   11/1998  Suh ........................................... 348/563

Primary Examiner—Sherrie Hsia

[57] ABSTRACT

A double window processing device for a television system capable of providing a high picture quality of double window pictures displayed on a screen by matching the synchronization of main-channel and sub-channel pictures. The double window processing device includes a first luminance/chrominance (Y/C) separating section for separating a main-channel composite video signal into first luminance and chrominance signals, a second Y/C separating section for separating the main-channel and sub-channel composite video signals into luminance and color difference signals for each channel, matching the synchronization of the respective separated luminance and color difference signals, and producing second luminance and chrominance signals for double windowing by combining the synchronization-matched luminance and color difference signals, and a Y/C switching section for switching the first and second luminance and chrominance signals from the first and second Y/C separating sections, and outputting final luminance and chrominance signals in a double window mode to display on a display screen the main-channel and sub-channel pictures according to the final luminance and chrominance signals.

4 Claims, 6 Drawing Sheets

DOUBLE WINDOW PROCESSING DEVICE FOR TELEVISION SYSTEM

BACKGROUND OF THE INVENTION

1. Field of the Invention

The present invention relates to a double window processing device for a television system, and more particularly to a double window processing device for a television system adopting multiple color systems which can improve the picture quality by matching the synchronization of a sub-channel picture with that of a main-channel picture.

2. Description of the Related Art

A conventional double window processing device for a television system, as shown in FIG. 1, includes main-channel and sub-channel tuners 101 and 104 for receiving radio frequency (RF) signals received through an antenna ANT, and outputting main-channel and sub-channel intermediate frequency (IF) signals, respectively, main-channel and sub-channel IF processing sections 102 and 105 for processing IF output signals of the main-channel and sub-channel tuners 101 and 104, and outputting composite video signals CVBS1 and CVBS2, respectively, a digital comb filter 103 for separating the composite video signal CVBS1 from the main-channel IF processing section 102 into a luminance signal $Y_M$ and a chrominance signal $C_M$, a double window processing section 106 for separating the composite video signal CVBS2 from the sub-channel IF processing section 105 into a luminance signal $Y_P$ and a chrominance signal $C_P$, a luminance/chrominance (Y/C) switching section 107 for switching the luminance and chrominance signals YM and CM from the digital comb filter 103 and the luminance and chrominance signals $Y_P$ and $C_P$ from the double window processing section 106, and outputting a final luminance signal Y and chrominance signal C, and a video processing section 108 for receiving the luminance and chrominance signals Y and C from the Y/C switching section 107, and outputting color signals of red (R), green (G), and blue (B) to a color picture tube (CPT).

The operation of the conventional double window processing device as constructed above will now be explained.

RF signals of the NTSC-M and FAL-M,N systems are inputted to the tuner 101 through the antenna ANT, and the turner 101 outputs the IF signal IF1 to the main-channel IF processing section 102.

The main-channel IF processing section 102 processes the IF signal IF1, and outputs the composite video signal CVBS1 to the digital comb filter 103. Accordingly, the digital comb filter 103 separates the composite video signal CVBS1 into the luminance signal $Y_M$ and the chrominance signal $C_M$.

The Y/C switching section 107 switches the luminance signal $Y_M$ and the chrominance signal $C_M$ separated by the digital comb filter 103, and outputs the switched luminance and chrominance signals to the video processing section 108. The video processing processing section 108 outputs the final RGB color signals to the CPT to display the color signals.

In the television system adopting a double window function, the tuner 104 receives and processes the RF signal received through the antenna ANT, and outputs the IF signal IF2 to the sub-channel IF processing section 105. The sub-channel IF processing section 105 processes the IF signal IF2, and outputs the composite video signal CVBS2 to the double window processing section 106.

The double window processing section 106 separates the composite video signal CVBS2 inputted from the sub-channel IF processing section 105 into the luminance signal $Y_P$ and the chrominance signal $C_P$, and output the separated luminance and chrominance signals $Y_P$ and $C_P$ to the Y/C switching section 107.

The Y/C switching section 107 receives the luminance and chrominance signals $Y_M$ and $C_M$ from the digital comb filter 103 as well as the luminance and chrominance signals $Y_P$ and $C_P$ from the double window processing section 106, and output the final luminance signal Y and chrominance signal C to the video processing section 108 by switching the luminance signals $Y_M$ and $Y_P$ and the chrominance signals $C_M$ and $C_P$, respectively.

The video processing section 108 combines the luminance signal Y and the chrominance signal C into the RGB color signals, and outputs the RGB color signals to the CPT, resulting in that a double-window picture is displayed on the CPT screen.

However, the conventional double window processing device has the drawback that when a viewer, for example, wishes to watch a main channel in an NTSC format and a sub-channel in a PAL format, or vice versa, the picture quality deteriorates due to the inconsistency of the synchronization between the main-channel and sub-channel pictures, which is caused by the different color systems when the double window function is performed for the main-channel and sub-channel pictures adopting the different color systems such as NTSC-M, PAL-M,N, etc.

SUMMARY OF THE INVENTION

It is an object of the present invention to solve the problems involved in the related art, and to provide a double window processing device for a television system which prevents the synchronous distortion between the main-channel and sub-channel pictures in a double window mode, and thus provides a clear picture by matching the synchronization of the main-channel picture with that of the sub-channel picture before producing the double window picture signals.

In order to achieve the above object, there is provided a double window processing device for a television system comprising:

tuning means for detecting received radio frequency (RF) signals, and outputting main-channel and sub-channel intermediate frequency (IF) signals;

IF processing means for processing the main-channel and sub-channel IF signals from the tuning means, and outputting main-channel and sub-channel composite video signals;

first luminance/chrominance (Y/C) separating means for separating the main-channel composite video signal from the IF processing means into first luminance and chrominance signals;

second Y/C separating means for separating the main-channel and sub-channel composite video signals from the IF processing means into luminance and color difference signals for each channel, matching the synchronization of the separated luminance and color difference signals, and producing second luminance and chrominance signals for double windowing by combining the synchronization-matched luminance and color difference signals;

Y/C switching means for switching the first and second luminance and chrominance signals from the first and second Y/C separating means, and outputting final luminance and chrominance signals in a double window mode; and video processing means for processing the final luminance and chrominance signals from the Y/C switching means, and outputting color signals to be displayed on a display screen.

Preferably, the second Y/c separating means comprises a first decoder for separating the main-channel composite video signal into luminance and color difference signals, a first delay for delaying an output signal of the first decoder for one horizontal scanning period (1 H), a second decoder for separating the sub-channel composite video signal into luminance and color difference signals, a second delay for delaying an output signal of the second decoder for 1 H, a horizontal sync generating section for matching the synchronization of the first decoder with that of the second decoder in accordance with horizontal sync signals from the first and second decoders, a double window processing section for temporarily storing output signals of the first and second delays in accordance with the horizontal sync signals of the main-channel and sub-channel pictures outputted from the horizontal sync generating section, and outputting the luminance and color difference signals for double windowing by combining the data stored therein, a synthetic sync generating section for generating a synthetic sync signal by synthesizing the horizontal and vertical sync signals from the video processing means, and an encoder for producing the second luminance and chrominance signals by combining the luminance and color difference signals from the double window processing section, and outputting the second luminance and chrominance signals to the Y/C switching means based on the synthetic sync signal from the synthetic sync generating section.

BRIEF DESCRIPTION OF THE DRAWINGS

The above object, other features and advantages of the present invention will become more apparent by describing the preferred embodiment thereof with reference to the accompanying drawings, in which;

FIGS. 6A to 6G are timing diagrams explaining the operation of the synthetic sync generating section of FIG. 5.

DETAILED DESCRIPTION OF THE PREFERRED EMBODIMENT

Figure 1:
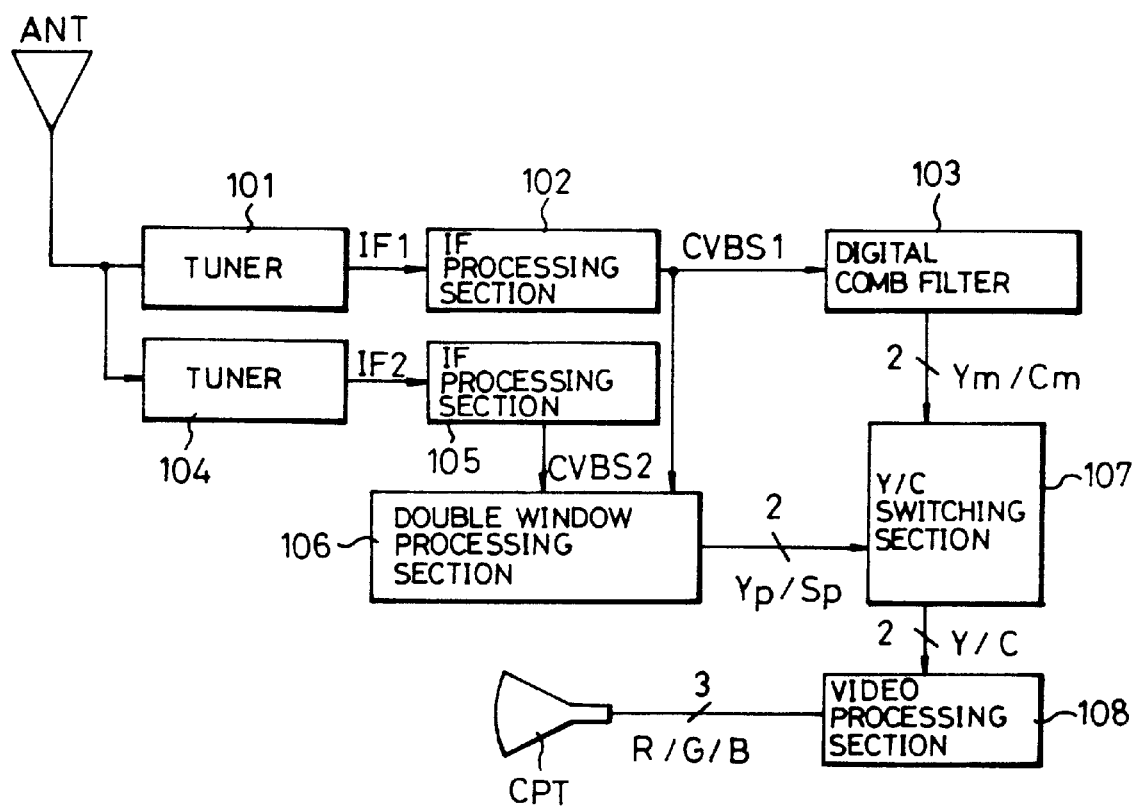
FIG. 1 is a block diagram of the conventional double window processing device.
Figure 2:
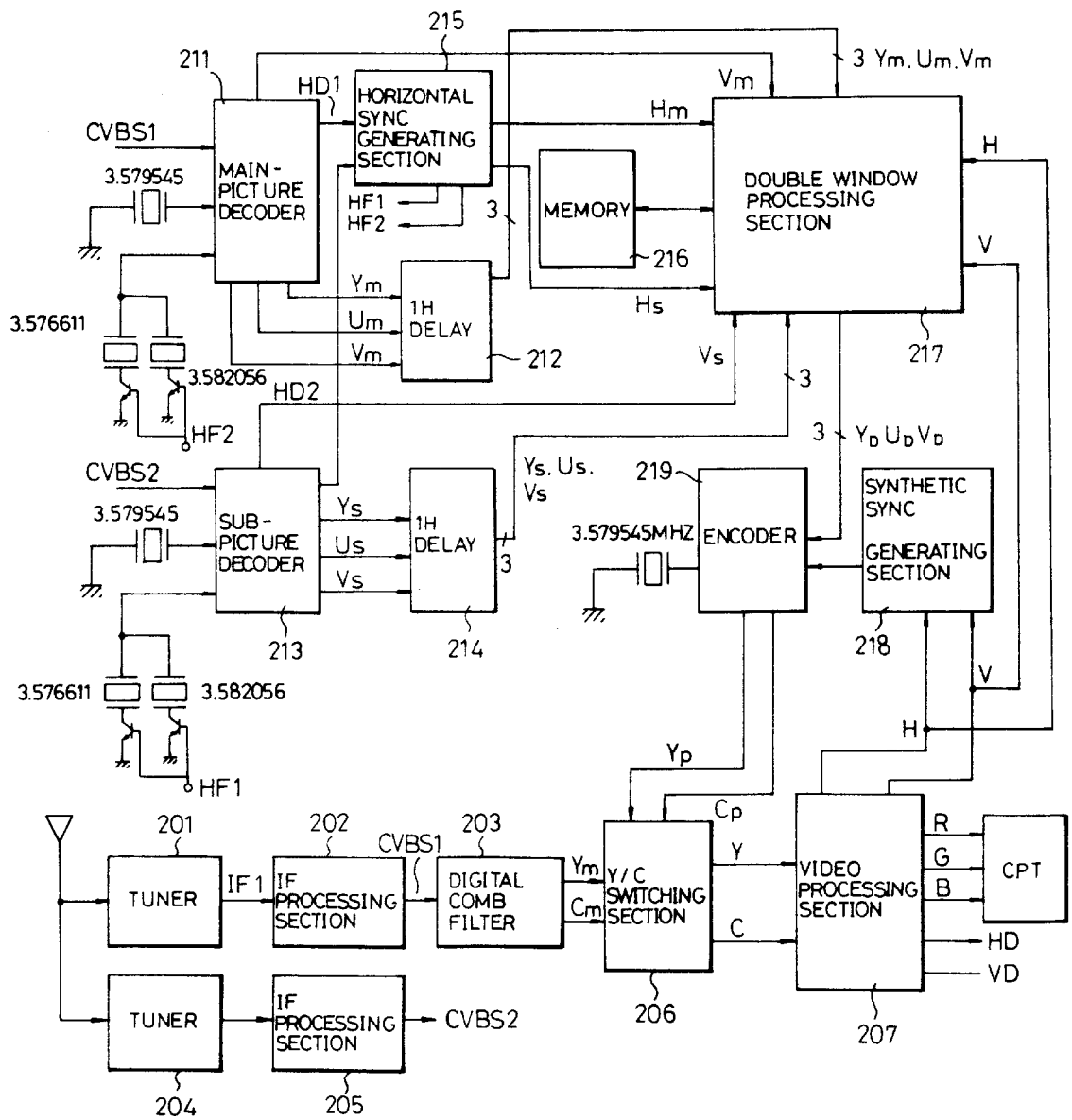
FIG. 2 is a block diagram of the double window processing device according to the present invention.

FIG. 2 illustrates the construction of the double window processing device for a television system according to the present invention.

Referring to FIG. 2, the double window processing device according to the present invention includes tuners 201 and 204 for receiving RF signals through an antenna ANT, and outputting main-channel and sub-channel IF signals IF1 and IF2, IF processing sections 202 and 205 for processing the IF signals IF1 and IF2 outputted from the tuners 201 and 204, and outputting main-channel and sub-channel composite video signals CVBS1 and CVBS2, a digital comb filter 203 for separating the main-channel composite video signal CVBS1 outputted from the IF processing section 202 into a luminance signal $Y_M$ and a chrominance signal $C_M$, a main-channel decoder 211 for separating the main-channel composite video signal CVBS1 outputted from the IF processing section 202 into the luminance signal $Y_M$ and color difference signals $U_M$ and $V_M$, a delay 212 for delaying for 1 H the luminance and color difference signals $Y_M$, $U_M$, and $V_M$ outputted from the main-channel decoder 211, a sub-channel decoder 213 for separating the sub-channel composite video signal CVBS2 outputted from the IF processing section 204 into a luminance signal $Y_S$ and color difference signals $U_S$ and $V_S$, a delay 214 for delaying for 1 H the luminance and color difference signals $Y_S$, $U_S$, and $V_S$ outputted from the sub-channel decoder 213, a horizontal sync generating section 215 for matching the synchronization of the horizontal sync signals HD1 and HD2 inputted from the decoders 211 and 213, respectively, and outputting matched horizontal sync signals $H_M$ and $H_S$, a memory 216 for temporarily storing the sub-channel data, and a double window processing section 217 for temporarily storing the main-channel data $Y_M$, $U_M$, and $V_M$, outputted from the delay 212 in accordance with the horizontal sync signals $H_M$ and $H_S$ outputted from the horizontal sync generating section 215, and double-windowing the main-channel data $Y_M$, $U_M$, and $V_M$ and the sub-channel data $Y_S$, $U_S$, and $V_S$ stored in the memory 216 to output a luminance signal $Y_D$ and color difference signals $U_D$ and $V_D$.

The double window processing device according to the present invention also includes an encoder 219 for combining the luminance and color difference signals $Y_D$, $U_D$, and $V_D$, outputted from the double window processing section 217 and outputting the second luminance signal $Y_P$ and chrominance signal $C_P$, a Y/C switching section 206 for switching the luminance and chrominance signals $Y_P$ and $C_P$ outputted from the encoder 219 and the luminance and chrominance signals $Y_M$ and $C_M$ outputted from the digital comb filter 205, and outputting the final luminance signal Y and chrominance signal C when the double window mode is selected, a video processing section 207 for processing the luminance signal Y and chrominance signal C outputted from the Y/C switching section 206, and outputting the RGB color signals to the CPT, and a synthetic sync generating section 218 for synthesizing the horizontal and vertical sync signals H and V outputted from the video processing section 207, and outputting the synthetic sync signals to the encoder 219.

Figure 3:
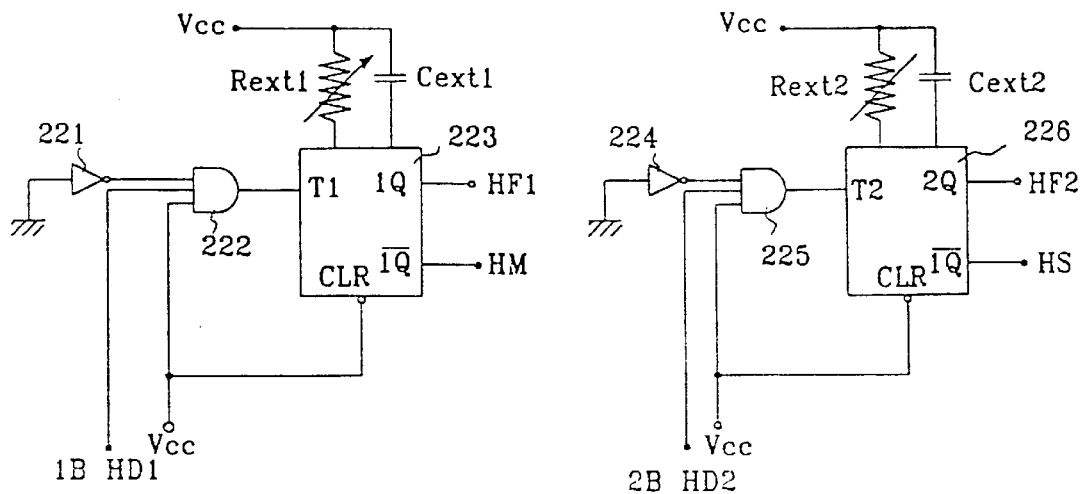
FIG. 3 is a schematic circuit diagram of the horizontal sync generating section of FIG. 2.

In the preferred embodiment, the horizontal sync generating section 215, as shown in FIG. 3, comprises inverters 221 and 224 for inverting a ground signal to a 'high' level signal, respectively, an AND gate 222 for receiving a supply voltage Vcc and the 'high' level output signal of the inverter 221, and outputting a 'high' level signal while the horizontal sync signal HD1 is in a 'high' state, an oscillator 223 for feeding a pulse HF1 having a predetermined width tw1 back to the sub-channel decoder 213 at the rising edge of the output signal of the AND gate 222, and outputting to the double window processing section 217 the pulse HF1 having the width tw1 and the inverted horizontal sync signal $H_M$, an AND gate 225 for receiving the supply voltage Vcc and the 'high' level output signal of the inverter 224, and outputting a 'high' level signal while the horizontal sync signal HD2 is in a 'high' level, and an oscillator 226 for feeding a pulse HF2 having a predetermined width tw2 back to the main-channel decoder 221 at the rising edge of the output signal of the AND gate 225, and outputting to the double window processing section 217 the pulse HF2 having the width tw2 and the inverted horizontal sync signal $H_S$.

In FIG. 3, the reference numerals Rext1, Cext1, Rext2, and Cext2 are resistors and capacitors for determining the output pulse width of the oscillators 223 and 226, respectively.

Figure 5:
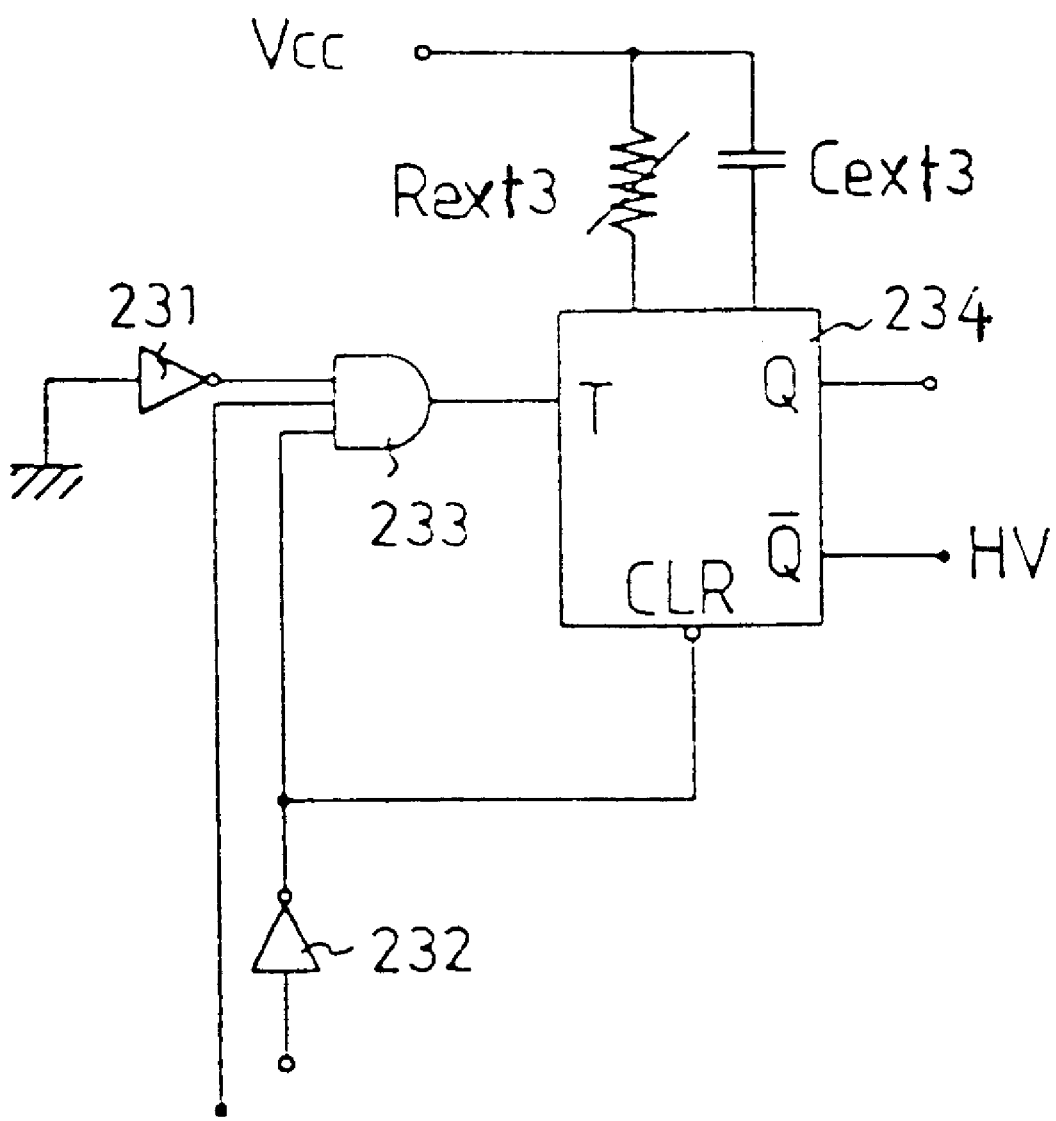
FIG. 5 is a schematic circuit diagram of the synthetic sync generating section of FIG. 2.

In the preferred embodiment, the synthetic sync generating section 218, as shown in FIG. 5, comprises an inverter 231 for inverting the ground signal to a 'high' level signal, an inverter 232 for inverting the vertical sync signal V outputted from the video processing section 207, an AND gate 233 for receiving the 'high' level signal and the inverted vertical sync signal outputted from the inverters 231 and 232, and outputting a 'high' level signal while the horizontal sync signal H outputted from the video processing section 207 is in a 'high' state, and an oscillator 234 for starting oscillation at the rising edge of the output signal of the AND gate 233, and providing the synthetic sync signal HV outputted through its inverting output terminal 3Q-bar to the encoder 219.

In FIG. 5, the reference numerals Rext 3 and Cext 3 are a resistor and a capacitor for determining the output pulse width of the oscillator 234.

The operation of the double window processing device according to the preferred embodiment of the present invention as constructed above will now be explained.

The RF signals are received to the tuners 201 and 204 through the antenna ANT, and the tuners 201 and 204 output the IF signals IF1 and IF2, to the IF processing sections 202 and 205, respectively.

The IF processing sections 202 and 205 process the IF signals IF1 and IF2, and outputs the main-channel and sub-channel composite video signals CVBS1 and CVBS2, respectively.

The main-channel decoder 211 separates the composite video signal CVBS1 outputted from the IF processing section 202 into the luminance signal $Y_M$ and the color difference signals $U_M$ and $V_M$, and the luminance and color difference signals $Y_M$, $U_M$, and $V_M$ separated by the main-channel decoder 211 are outputted to the double window processing section 217 after being delayed for 1 H through the delay 212.

The sub-channel decoder 213 separates the composite video signal CVBS2 outputted from the IF processing section 204 into the luminance signal $Y_S$ and the color difference signals $U_S$ and $V_S$, and the separated luminance and color difference signals $Y_S$, $U_S$, and $V_S$ are outputted to the double window processing section 217 after being delayed for 1 H through the delay 214.

The delays 212 and 214 play a role of accurately adjusting the phase of the color difference signals decoded by the PAL system decoder.

The horizontal sync generating section 215 matches the synchronization of the horizontal sync signal HD1 outputted from the main-channel decoder 211 and the horizontal sync signal HD2 outputted from the sub-channel decoder 213, and outputs the matched horizontal sync signals $H_M$ and $H_S$ to the double window processing section 217.

The double window processing section 217 receives and stores in a built-in memory the luminance and color difference signals $Y_M$, $U_M$, and $V_M$ outputted from the delay 212 in accordance with the horizontal sync signal $H_M$ outputted from the horizontal sync generating section 215, while it stores in the memory 216 the luminance and color difference signals $Y_S$, $U_S$, and $V_S$ outputted from the delay 214 in accordance with the horizontal sync signal $H_S$ outputted from the horizontal sync generating section 215.

Thereafter, the double window processing section 217 combines the luminance and color difference data $Y_M$, $U_M$, and $V_M$ of the main-channel picture stored in the built-in memory with the luminance and color difference data $Y_S$, $U_S$, and $V_S$ of the sub-channel picture stored in the memory 216 in accordance with the horizontal and vertical sync signals H and V outputted from the video processing section 207, and outputs the digital luminance signal $Y_D$ and the digital color difference signals $U_D$ and $V_D$ to the encoder 219.

Figure 6A:
Figure 6B:
Figure 6C:
Figure 6D:
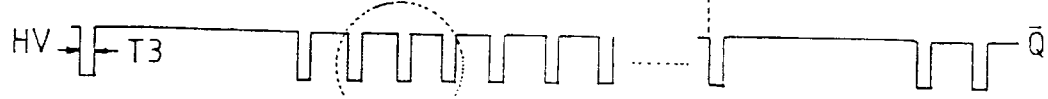
Figure 6E:
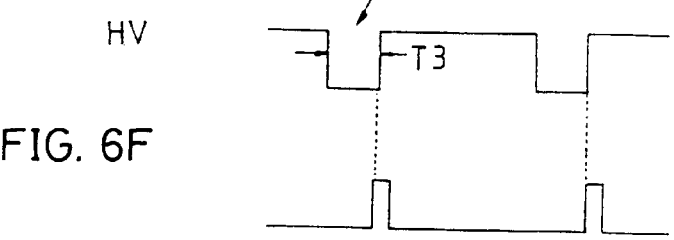
Figure 6F:
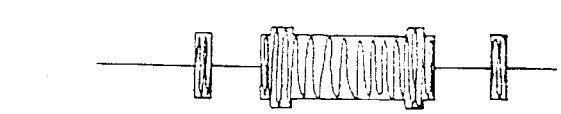

At this time, the synthetic sync generating section 218 synthesizes the horizontal and vertical sync signals H and V outputted from the video processing section 207, and, as shown in FIGS. 6E and 6F, outputs to the encoder 219 the synthetic sync pulse HV, the falling edge of which is aligned with the rising edge of a burst gate pulse of FIG. 6F.

The encoder 219 processes the luminance and color difference signals $Y_D$, $U_D$, and $V_D$ outputted from the double window processing section 217 in accordance with the synthetic sync signal HV outputted from the synthetic sync generating section 218, and outputs the final double-window luminance and chrominance signals $Y_P$ and $C_P$ to the Y/C switching section 206. At this time, the chrominance signal $C_P$ is outputted from the encoder in a manner that its starting point is aligned with the rising edge of the burst gate pulse which is also aligned with the falling edge of the synthetic sync signal HV as shown in FIGS. 6A to 6G.

The digital comb filter 203 separates the composite video signal CVBS1 inputted from the IF processing section 202 into the luminance signal $Y_M$ and the chrominance signal $C_M$, and outputs the separated luminance and chrominance signals $Y_M$ and $C_M$ to the Y/C switching section 206.

Accordingly, if the double window mode is not selected, the Y/C switching section 206 outputs the luminance signal $Y_M$ and the chrominance signal $C_M$ inputted from the digital comb filter 203 to the video processing section 207 as they stand, and thus the video processing section 207 outputs the RGB color signals to the CPT, so that only the main-channel picture is displayed on the CPT screen.

If the double window mode is selected, the Y/C switching section 206 switches the luminance and chrominance signals $Y_M$ and $C_M$ outputted from the digital comb filter 203 and the luminance and chrominance signals $Y_P$ and $C_P$ outputted from the encoder 219, and outputs the final luminance and chrominance signals Y and C to the video processing section 207.

Figure 7:
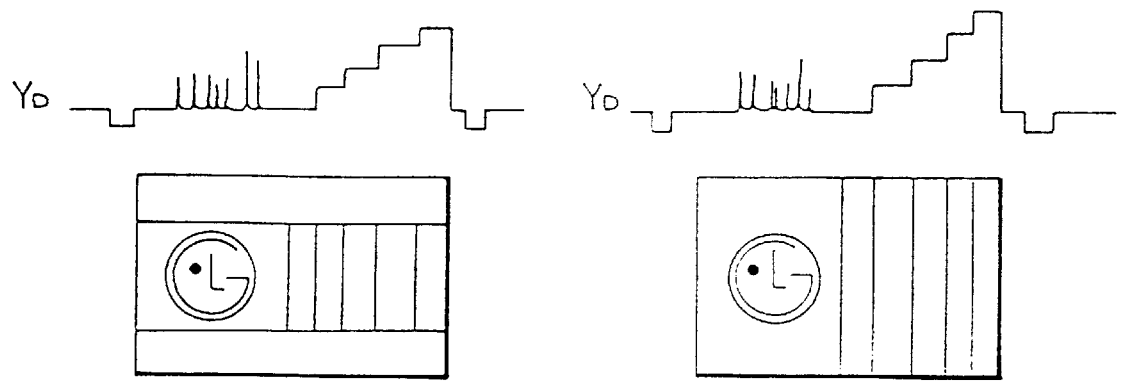
FIG. 7 is a schematic view illustrating the display state of the double window pictures.

The video processing section combines the luminance signal Y and the chrominance signal C, and outputs the RGB color signals to the CPT, so that the main-channel picture and the sub-channel picture are simultaneously displayed on the CPT screen. FIG. 7 shows the display state of the double window pictures.

Meanwhile, the operation of the horizontal sync generating section 215 as described above will now be explained in detail with reference to FIGS. 3, 4A to 4F.

Figure 4A:
FIGS. 4A to 4F are timing diagrams explaining the operation of the horizontal sync generating section of FIG. 3.
Figure 4B:
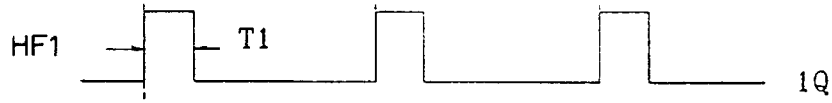
Figure 4C:
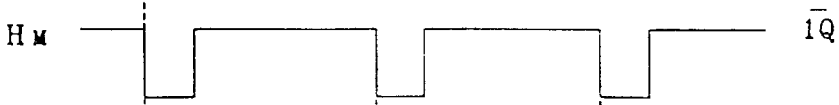

Since the output signal of the inverter 221 in the horizontal sync generating section 215 is always "1", the oscillator 223 performs its operation at the rising edge of the output signal of the AND gate 222, which is produced by the rising edge of the horizontal sync signal HD1 outputted from the main-channel decoder 211 as shown in FIG. 4A, and outputs pulse signals HF1 and $H_M$ having a pulse width tw1 which is determined by the time constant caused by the resistor Rext1 and the capacitor Cext1, as shown in FIGS. 4B and 4C.

Figure 4D:
Figure 4E:
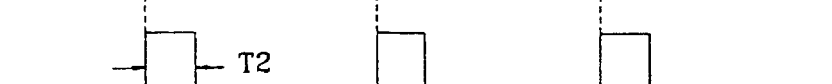
Figure 4F:

Also, since the output signal of the inverter 224 in the horizontal sync generating section 215 is always "1", the oscillator 226 performs its operation at the rising edge of the output signal of the AND gate 225, which is produced by the rising edge of the horizontal sync signal HD2 outputted from the sub-channel decoder 213 as shown in FIG. 4D, and outputs pulse signals HF2 and $H_S$ having a pulse width tw2 which is determined by the time constant caused by the resistor Rext2 and the capacitor Cext2, as shown in FIGS. 4E and 4F.

The feedback pulse signal HF1 outputted from the oscillator 223 has a phase opposite to that of the horizontal sync signal $H_M$ as shown in FIGS. 4B and 4C, and the feedback pulse HF2 outputted from the oscillator 226 has a phase opposite to that of the horizontal sync signal $H_S$ as shown in FIGS. 4E and 4F.

The pulse width tw1 of the output signal HF1 of the oscillator 223 is given as the following expression:

$$tw1 = A \cdot Rext1 \cdot Cext1$$

where, A represents a constant determined by the oscillator 223.

The pulse signal HF1 outputted from the non-inverting output terminal 1Q of the oscillator 223 is inputted to the horizontal feedback terminal of the sub-channel decoder 213, and the pulse signal HF2 outputted from the non-inverting output terminal 2Q of the oscillator 226 is inputted to the horizontal feedback terminal of the main-channel decoder 211.

Accordingly, the horizontal sync signal HD1 outputted from the main-channel decoder 211 is affected by the feedback pulse HF2 of the horizontal sync generating section 215 as shown as a dotted line in FIG. 4A, and thus follows the synchronization of the sub-channel picture. Also, the horizontal sync signal HD2 outputted from the sub-channel decoder 213 is affected by the feedback pulse HF1 of the horizontal sync generating section 215 as shown as a dotted line in FIG. 4D, and thus follows the synchronization of the main-channel picture.

As a result, the output waveforms of the oscillators 223 and 226 in the horizontal sync generating section 215 are complemented with each other, and the horizontal sync signals $H_M$ and $H_S$ having the synchronization-matched waveforms are outputted to the double window processing section 217.

Also, the operation of the synthetic sync generating section 218 for outputting the synthetic sync signal HV to the encoder 219 will be explained in detail with reference to FIGS. 5, 6A to 6G.

Since the output signal of the inverter 231 in the synthetic sync generating section 218 is always "1", the vertical sync signal V outputted from the video processing section 207 becomes 'low' as shown in FIG. 6B, and the output signal of the inverter 232 goes to "1". Thus, the AND gate 233 outputs a 'high' level signal when the horizontal sync signal H from the video processing section 207 is 'high' as shown in FIG. 6A.

At the rising edge of the output signal of the AND gate 233 which receives the horizontal sync signal H from the video processing section 207 as shown in FIG. 6A, the oscillator 234 performs its operation, and outputs pulse signals having a pulse width tw3 determined by the time constant caused by the resistor Rext3 and the capacitor Cext3, as shown in FIGS. 6C and 6D. Accordingly, the synthetic sync signal HV outputted from the inverting output terminal 3Q-bar of the oscillator 234 is inputted to the encoder 218.

As described above, according to the double window processing device for a television system adopting multiple color systems according to the present invention, the synchronization of the double window picture signals are matched with each other, and thus clear double window pictures can be obtained with the interference between the two pictures and howling phenomena of the pictures prevented.

While the present invention has been described and illustrated herein with reference to the preferred embodiment thereof, it will be understood by those skilled in the art that various changes in form and details may be made therein without departing from the spirit and scope of the invention.

What is claimed is:

1. A double window processing device of a television system for receiving and processing main-channel and sub-channel composite video signals detected from received radio frequency signals, the double window processing device comprising:

first luminance/chrominance (Y/C) separating means for separating the main-channel composite video signal into first luminance and chrominance signals;

second Y/C separating means for separating the main-channel and sub-channel composite video signals into luminance and color difference signals for each channel, matching the synchronization of the respective separated luminance and color difference signals, and producing second luminance and chrominance signals for double windowing by combining the synchronization-matched luminance and color difference signals; and Y/C switching means for switching the first and second luminance and chrominance signals from the first and second Y/C separating means, and outputting final luminance and chrominance signals in a double window mode to display on a display screen main-channel and sub-channel pictures according to the final luminance and chrominance signals.

2. The double window processing device as claimed in claim 1, wherein the second Y/C separating means comprises:

a first decoder for separating the main-channel composite video signal into first luminance and color difference signals;

a first delay for delaying an output signal of the first decoder for one horizontal scanning period (1 H);

a second decoder for separating the sub-channel composite video signal into second luminance and color difference signals;

a second delay for delaying an output signal of the second decoder for 1 H;

a horizontal sync generating section for matching the synchronization of the first decoder with the synchronization of the second decoder in accordance with horizontal sync signals from the first and second decoders;

a double window processing section for temporarily storing output signals of the first and second delays in accordance with the horizontal sync signals of the main-channel and sub-channel pictures outputted from the horizontal sync generating section, and outputting third luminance and color difference signals for double windowing by combining data stored therein;

a synthetic sync generating section for generating a synthetic sync signal by synthesizing horizontal and vertical sync signals provided from video processing means; and an encoder for producing the second luminance and chrominance signals by combining the third luminance and color difference signals from the double window processing section, and outputting the second luminance and chrominance signals to the Y/C switching means based on the synthetic sync signal from the synthetic sync generating section.

3. The double window processing device as claimed in claim 2, wherein the horizontal sync generating section comprises:

first and second inverters for inverting a ground signal to a 'high' level signal, respectively;

a first AND gate for receiving a supply voltage and the 'high' level signal of the first inverter, and outputting a 'high' level signal while the horizontal sync signal is in a 'high' state;

a first oscillator for feeding a first pulse signal having a predetermined width back to the sub-channel decoder at a rising edge of the output signal of the first AND gate, and outputting to the double window processing section the first pulse signal and the inverted horizontal sync signal;

a second AND gate for receiving the supply voltage and the 'high' level signal of the second inverter, and outputting a 'high' level signal while the horizontal sync signal HD2 is in a 'high' level; and a second oscillator for feeding a second pulse signal having a predetermined width back to the main-channel decoder at a rising edge of the output signal of the second AND gate, and outputting to the double window processing section the second pulse signal and the inverted horizontal sync signal.

4. The double window processing device as claimed in claim 2, wherein the synthetic sync generating section comprises:

a first inverter for inverting a ground signal to a 'high' level signal;

a second inverter for inverting the vertical sync signal outputted from the video processing means;

an AND gate for receiving the 'high' level signal and the inverted vertical sync signal outputted from the first and second inverters, and outputting a 'high' level signal while the horizontal sync signal outputted from the video processing means is in a 'high' state; and an oscillator for starting oscillation at a rising edge of the output signal of the AND gate, and providing the synthetic sync signal outputted through its inverting output terminal to the encoder.

* * * * *